United States Patent [19]

Bienvenu

[11] Patent Number: 5,102,646
[45] Date of Patent: Apr. 7, 1992

[54] METHOD OF FABRICATION OF CERAMIC POWDERS

[75] Inventor: Gérard Bienvenu, Sevraz, France

[73] Assignee: Cerex, Annemasse, France

[21] Appl. No.: 526,532

[22] Filed: Apr. 20, 1990

Related U.S. Application Data

[63] Continuation of Ser. No. 261,835, Aug. 30, 1988, abandoned.

[30] Foreign Application Priority Data

Dec. 31, 1987 [FR] France ................ 87 00097

[51] Int. Cl.[5] ............................................. C04B 35/56
[52] U.S. Cl. ..................................... 423/439; 423/345; 423/440; 501/87; 501/88; 501/91; 501/93
[58] Field of Search .................... 501/87, 88, 91, 92, 501/93, 96, 97; 423/290, 291, 297, 344, 345, 406, 411, 412, 439, 440

[56] References Cited

U.S. PATENT DOCUMENTS

| | | | |
|---|---|---|---|
| 3,253,886 | 5/1966 | Lamprey et al. | 501/87 |
| 3,450,499 | 6/1969 | Yates | 423/409 |
| 3,545,922 | 12/1970 | Neuenschwander et al. | 423/411 |
| 4,005,235 | 1/1977 | Prochazka | 501/93 |
| 4,017,587 | 4/1977 | Ditter et al. | 423/291 |
| 4,073,845 | 2/1978 | Buljan et al. | 501/97 |
| 4,080,431 | 3/1978 | Moss | 423/411 |
| 4,124,402 | 11/1978 | Greskovich et al. | 501/97 |
| 4,333,915 | 6/1982 | Iwai et al. | 501/87 |
| 4,459,363 | 7/1984 | Holt | 423/406 |
| 4,460,697 | 7/1984 | Hara et al. | 501/87 |
| 4,612,045 | 9/1986 | Shintaku | 423/412 |
| 4,676,966 | 6/1987 | Endo et al. | 423/345 |
| 4,719,095 | 1/1988 | Abe et al. | 423/345 |

FOREIGN PATENT DOCUMENTS 1479727  7/1977 United Kingdom ............... 423/440

Primary Examiner—William R. Dixon, Jr.
Assistant Examiner—Anthony J. Green
Attorney, Agent, or Firm—Fleit, Jacobson, Cohn, Price, Holman & Stern

[57] ABSTRACT

The invention relates to a method of fabrication in the powdered state of ceramic compounds formed between a metalloid and a refractory metal, characterized in that it involves the following steps:

a) said metalloid is caused to react with a reducing metal within a liquid bath constituted at least partly by a fused salt of said reducing metal in order to obtain a saltlike intermediate compound which combines said reducing metal and the metalloid, in solution in said bath, b) a reducible salt of said refractory metal is then injected into said bath in a divided form which is directly distributed throughout the bath in order to produce said powder by reaction of the reducible salt with said intermediate compound of the reducing metal.

9 Claims, No Drawings

METHOD OF FABRICATION OF CERAMIC POWDERS

This is a continuation of application Ser. No. 07/261,835, filed Aug. 30, 1988 which is now abandoned.

BACKGROUND OF THE INVENTION

The present invention relates to the fabrication of ceramic powders consisting of compounds formed between at least one element having the quality of a metalloid and at least one element having the quality of a metal. Without any limitation being implied, the invention applies primarily to the production of carbides, nitrides or carbonitrides of refractory metals consisting in particular of titanium, tantalum, silicon, boron, aluminum and mixtures of these metals. In this context, the aim of the invention is essentially to obtain powders having improved properties.

BRIEF SUMMARY OF THE INVENTION

To this end, the invention proposes to take advantage of the fact that metalloids have the property of forming saltlike compounds with certain elements, more particularly with the alkali and alkaline-earth elements, these saltlike compounds being soluble in salts of said elements in the molten state, namely halides as a general rule. The reaction which leads to the ceramic compound is then carried out in this fused salt with a salt of the metal chosen which is capable of combining with the metalloid of the saltlike compound.

DETAILED DESCRIPTION

One example of a saltlike metalloid compound of this type is calcium carbide $CaC_2$ which is soluble in the halides of calcium in the molten state and more particularly in calcium chloride $CaCl_2$. It proves necessary in this particular case to refer to a known process for the preparation of refractory metal powders and more especially for the preparation of titanium powders. This process consists in carrying out reduction of titanium from titanium tetrachloride in a eutectic bath of sodium chloride and calcium chloride in which calcium carbide is progressively dissolved.

In the practical application of this method, it is readily apparent that reduction of titanium by calcium carbide gives rise to a carbon deposit which is found to be present with the titanium powder in the solid products of the reaction since this element is insoluble in the fused salt. This is not found to correspond, however, to the powder obtained in accordance with the present invention since it is in fact a mixture of carbon and titanium and is not a powder of a well-defined intermetallic compound which, in this particular case, should be titanium carbide TiC.

With respect to this state of the technique, the invention has the advantage of leading to the production of ceramic compounds in the form of a powder which is very homogeneous both in regard to its chemical composition and in regard to its physical properties, in reproducible particle sizes which are usually submicronic. In consequence, these powders fully satisfy the requirements of recent high-technology applications. They are specially suited for the manufacture of cutting tools of carbide, nitride or refractory carbonitride and for the manufacture of all kinds of high-performance structural elements which are shaped by means of powder metallurgy technologies applied to cermets. In this type of application, the powders obtained by the method in accordance with the invention can be utilized directly as a replacement for powders which can be obtained in accordance with known practice by dry nitriding or carburization of the corresponding metal oxides and crushing of the solid products obtained.

To this end, the invention proposes a method of fabrication in the powdered state of ceramic compounds formed between a metalloid and a refractory metal, characterized in that it involves the following steps:

a) said metalloid is caused to react with a reducing metal within a liquid bath constituted at least partly by a fused salt of said reducing metal in order to obtain a saltlike intermediate compound which combines the reducing metal and the metalloid, in solution in said bath;

b) a reducible salt of said refractory metal is then injected into said bath in a divided form which is directly distributed throughout the bath in order to produce said powder by reaction of the reducible salt with said intermediate compound of the reducing metal.

In a particular mode of execution of the method in accordance with the invention, this method further comprises a step c) in which an additional quantity of reducing metal is introduced into the bath in order to react with any excess metalloid which may have been left by the reaction of step b) before collecting the ceramic powder produced.

The opportunity of this step c) essentially depends on the stoichiometry of the reaction carried out in step b).

The method in accordance with the invention is applicable to the fabrication of a large number of ceramic powders by suitably selecting the intermediate reducing metal, the nature of the fused salt constituting the bath, the nature of the reducible salt of the refractory metal as well as the operating conditions of the successive steps, in particular in regard to the temperature at which the bath is maintained in step b) in order to produce the desired reaction, advantageously in such a manner as to ensure that the temperature of the bath consequently produces vaporization of the reducible salt of the refractory metal.

In the majority of applications, it is an advantage to choose salts consisting of halides and especially chlorides, both for the fused-salt bath and for the reducible salt of the refractory metal. The solvent bath can thus advantageously be constituted by calcium chloride $CaCl_2$ as employed either in the pure state or mixed with other halides.

In a preferred form of execution of the method in accordance with the invention in regard to step a), the reducing metal is first dissolved in the bath and the metalloid is introduced in substantially stoichiometric proportions so as to form the saltlike intermediate compound, the proportion of the bath being sufficient to ensure complete dissolution of the intermediate compound. If necessary, the metalloid is introduced in the form of a solution in another portion of fused salt.

Naturally, the invention is also concerned with the ceramic powders obtained by the method described above and especially those which are thus obtained in a submicronic particle size.

The production of powders having high purity appears to be essentially related to the simultaneous action of a reduction of the refractory metal and of its reaction with the metalloid, starting from a pure compound derived from the combination of the pure reducing metal and of the pure metalloid which is preferably formed in situ in a fused-salt bath, and which is in any case introduced for dissolution in this latter before putting it in the presence of the metal to be reduced, thus resulting in fine nucleation. Moreover, it has appeared conducive to fine and uniform particle size if the reaction of step b) takes place in contact with bubbles which are formed by the reducible salt in the gaseous state and uniformly distributed throughout the mass of the fused-salt bath. This clearly does not imply any limitation to a particular interpretation of the homogeneous reaction between the dissolved species but it is probable that the fine dispersion of the bubbles produces better dissolution of the metallic compound since the reduction reaction takes place between a saltlike compound and the corresponding ion of the metalloid.

The elements which, in the metallic state, are partly soluble in a fused salt of the same element and which are capable of forming with the metalloids saltlike compounds constituting the intermediate compound mentioned above can be selected mainly:

either from the family of alkali metals comprising lithium (Li), sodium (Na) and potassium (K),
or from the family of alkaline-earth metals comprising beryllium (Be), magnesium (Mg), calcium (Ca), strontium (Sr) and barium (Ba),
or again from aluminum mixed with lithium if the metalloid is hydrogen since aluminum forms a double hydride with lithium,
or uranium which forms saltlike carbides with the carbon employed as metalloid.

The metalloids which are preferably employed in the practical execution of the invention are nitrogen (N), phosphorus (P), carbon (C), silicon (Si) and boron (B) or oxygen (O). They serve to form with the above-mentioned metal compounds which are dissolved in the fused salt and which then liberate the reducing metal at the time of contacting with the reducible salt. In the preferred forms of execution of the invention, the reducing metal is calcium and the solvent fused-salt is calcium chloride. Once the calcium is dissolved in this bath, the metalloid is preferably carbon which is introduced into this bath in the solid state or nitrogen which is introduced in the gaseous state. This calcium can also be combined partly with carbon and partly with nitrogen, in which case the method in accordance with the invention leads to the fabrication of carbonitrides.

The refractory metals which are capable of forming well-defined compounds with the above-mentioned metalloids, more particularly with carbon and/or nitrogen, in the method of fabrication of ceramic powders in accordance with the invention, are advantageously: titanium (Ti), zirconium (Zr), hafnium (Hf), boron (B), silicon (Si), tantalum (Ta), niobium (Nb), molybdenum (Mo), tungsten (W), aluminum (Al) as well as their mixtures. They are injected into the fused-salt bath in step b) of the method in the form of reducible salt and preferably in the form of halide and especially chloride. It will be noted that boron in the present invention may be employed either as a reducing agent with calcium boride ($B_6Ca$) or as a metal in order to obtain boron carbide ($B_4C$) or boron nitride (BN). Its behavior is intermediate between that of metals and metalloids.

It has been seen in the foregoing that it was usually preferable, although not always essential, to ensure that the reducible salt comes into contact with the saltlike compound of the reducing metal when it is in the form of gaseous bubbles distributed throughout the bath. It is therefore an advantage to maintain the fused-salt bath at a temperature at least equal to the temperature of vaporization of the reducible salt. The reducible salt can itself be already in the gaseous state at the moment of injection but can also be in the liquid state or dissolved in a fused salt, or also in the state of a solid in a divided form when the operating conditions are such that it immediately vaporizes in the bath.

The invention will now be more completely described within the scope of particular examples of application which concern the preparation of submicronic powders of carbides, nitrides or carbonitrides of refractory metals mainly selected from titanium, tungsten, boron, silicon, aluminum and their mixtures or if necessary, in addition, from tantalum, zirconium, hafnium, niobium, molybdenum.

EXAMPLE 1

A titanium carbide powder is prepared in accordance with the invention by employing as reducing agent calcium carbide prepared in situ in a fused-salt bath essentially consisting of calcium chloride.

To this end, there is employed a mass of 20 kg of fused $CaCl_2$ which has previously been dehydrated.

In order to synthesize the calcium carbide in situ, one begins by dissolving 866 g of calcium in the calcium chloride bath and one then adds 520 g of carbon at 850° C. so as to produce the reaction:

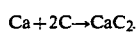

$$Ca + 2C \rightarrow CaC_2.$$

There are then injected into the bath 1920 g of titanium tetrachloride ($TiCl_4$) which is supplied in gaseous form by means of a diffuser which rapidly distributes it throughout the bath. This latter is maintained at a temperature of 1000° C. The following reaction is thus carried out:

$$TiCl_4 + 2CaC_2 \rightarrow TiC + 2CaCl_2 + 3C.$$

In order to eliminate the solid carbon left as by-product by the stoichiometric reaction, 610 g of calcium are added to the bath when the disappearance of gas bubbles indicates the end of the reaction of formation of titanium carbide. This addition has the result of recombining the calcium in the state of soluble calcium carbide in the calcium chloride bath.

One then collects the titanium carbide which is obtained in the powdered solid state by any one of the conventional methods of solid/liquid separation such as decantation, filtration or centrifugation.

The titanium carbide powder thus obtained has a mean particle diameter of 0.5 micron and its lattice parameter is a=4.3279 Angströms.

EXAMPLE 2

In order to carry out the production of a powder of titanium nitride TiN, calcium nitride is employed as reducing agent.

The reactions take place in a fused-salt bath of 20 kg of calcium chloride $CaCl_2$. In this bath are dissolved 160 g of calcium and this latter is then reacted with nitrogen which is injected at a rate of 2 liters per hour, the bath being maintained at a temperature of 850° C. The reaction is written as follows:

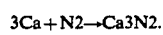

$$3Ca + N_2 \rightarrow Ca_3N_2.$$

There is then introduced 0.22 liter of titanium tetrachloride TiCl4 which is injected in the gaseous state into the reaction bath by means of a diffuser. For this operation, the temperature of the bath is increased to 1000° C. Under these conditions, the following reaction takes place:

$$2Ca_3N_2 + 3TiCl_4 \rightarrow 3TiN + 6CaCl_2 + \tfrac{1}{2}N_2$$

The nitrogen which is evolved is removed whilst the solid titanium nitride powder is separated from the liquid bath.

After washing with an acid aqueous solution in which is dissolved the calcium chloride which may have been entrained, the product is presented in the form of a very fine powder of deep black color having a lattice parameter of a=4.2359 Angströms with a variation of 0.257%, the particle diameter of which is smaller than 0.1 micron.

EXAMPLE 3

In order to produce titanium carbonitride, the intermediate reducing compounds are obtained by successive introduction of carbon and nitrogen into a fused-salt bath of 2 kg of CaCl2.

The quantities of reagents employed are 80 g of calcium and 48 g of carbon which react so as to form calcium carbide in solution in the chloride bath. The bath being maintained at a temperature of the order of 800° C., nitrogen is then injected therein at a rate of 2 liters per hour.

The reaction is as follows:

$$CaC_2 + N_2 \rightarrow C + CaCN_2.$$

The reaction therefore supplies calcium cyanamide which is soluble in the fused calcium chloride bath and which serves as reducing agent for the titanium tetrachloride, 105 cl of which is then injected by a diffuser.

There then takes place the following reaction:

$$2CaCN_2 + TiCl_4 \rightarrow 2CaCl_2 + Ti(C,N) + 3N/2$$

This reaction is carried out at 900° C.

The chemical composition of the powder obtained corresponds to the formula Ti(C 0.75, N 0.25). Its lattice parameter is a=4.30266 Angströms with a mean variation of 0.00287 Angströms.

EXAMPLE 4

The method of the invention is applied to the synthesis of silicon nitride Si3N4. This method is carried out in two steps in a fused-salt bath formed of 3 kg of calcium chloride.

With 248 g of Ca, Ca2N3 is first synthesized at 800° C. in accordance with the reaction:

$$3Ca + N_2 \rightarrow Ca_3N_2.$$

Nitrogen is injected into the bath by a diffuser at a rate of 5 liters per hour.

At the time of subsequent injection of silicon chloride SiCl4 at the same temperature, the following intermediate reaction takes place:

$$SiCl_4 + Ca_3N_2 \rightarrow CaSiN_2.$$

And when the temperature is subsequently increased to 1000° C., complete nitriding of the silicon is obtained in accordance with the reaction:

$$2CaSiN_2 + SiCl_4 \rightarrow Si_3N_4 + 2CaCl_2.$$

A total quantity of 970 cm³ of SiCl4 is injected. Destruction of the CaSiN2 is complete.

The powder thus obtained is separated from the liquid bath, then washed with slightly hydrochloric water. Its particle diameter is 0.3 micron.

EXAMPLE 5

The production of a powder of tantalum carbide TaC is carried out by the method of the invention as described in Example 1 in the case of titanium carbide except for the fact that tantalum chloride TaCl5 is introduced in the solid state and no longer in the gaseous state. In fact, tantalum pentachloride is introduced in a highly divided form and vaporizes immediately in contact with the calcium chloride bath. This vaporization in conjunction with agitation of the bath permits high diffusion of the compound throughout the bath. The TaC thus formed has a large specific surface which is higher than 45 m²/g.

EXAMPLE 6

In accordance with the same procedure as that of Example 1, silicon carbide SiC is synthesized.

1175 g of calcium are introduced into a fused-salt bath of 15 kg of CaCl2 followed by 710 g of carbon.

32 liters of silicon tetrachloride are then injected at 1020° C., with the result that the following reaction takes place:

$$SiCl_4 + 2CaC_2 \rightarrow SiC + 3C + 2CaCl_2$$

The bath is allowed to cool, whereupon calcium is added in order to redissolve the carbon and the silicon carbide powder is separated for subsequent washing. This powder has a particle diameter of 0.5 micron.

EXAMPLE 7

The method is applied to the production of boron carbide B4C. Calcium carbide is first prepared in situ in a bath of 15 kg of fused calcium chloride by reaction of 1175 g of calcium and 710 g of carbon at 850° C.

By means of a diffuser, 1.6 liter of BCl3 is then injected into the bath so as to produce the following reaction at 950° C.:

$$4BCl_3 + CaC_2 \rightarrow B_4C + 6CaC_2 \rightarrow B_4C + 6CaCl_2 + 11C$$

The large quantity of carbon produced which is liable to impair the quality of the B4C powder is eliminated by adding 1070 g of Ca in order to obtain the equivalent quantity of calcium carbide which is soluble in the bath.

After cooling of the bath, there is obtained by filtration a B4C powder having a mean particle diameter of 0.6 micron.

EXAMPLE 8

The method is applied to the production of boron nitride.

Into a bath of 5 kg of fused CaCl2, there are dissolved 400 g of calcium, whereupon nitrogen is injected by means of a diffuser at 20 liters per hour in order to produce the following reaction at 850° C.:

$$3Ca + N_2 \rightarrow Ca_3N_2.$$

The temperature of the bath is then increased to 1000° C. and 1.6 liter of boron trichloride $BCl_3$ is injected by means of a diffuser. The following reaction takes place:

$$2BCl_3 + Ca_3N_2 \rightarrow 2BN + 3CaCl_2$$

The reaction is complete. There is therefore no need to add calcium. By washing and filtration, a boron nitride powder having a particle diameter of 0.65 micron is obtained.

EXAMPLE 9

An aluminum nitride powder AlN is produced in a fused-salt bath containing 1 kg of calcium nitride. The intermediate reducing compound is $Ca_3N_2$ which is obtained by dissolving 80 g of calcium in the bath and reacting with nitrogen introduced by an injection tube at a rate of 20 liters per hour.

180 g of $AlCl_3$ is then injected into the bath in gaseous form by means of an injection tube in order to produce the following reaction:

$$2AlCl_3 + Ca_3N_2 \rightarrow 2CaCl_2 + 2AlN$$

By virtue of the diffusion of the reagent in the form of saturation bubbles, the reaction is complete. By washing and filtration, there is obtained a powder having a particle diameter within the range of 0.2 to 0.8 micron.

EXAMPLE 10

Whereas the preceding examples illustrate the preparation of submicronic carbide powder by reaction between reducing calcium carbide and reducible salts constituted by $TiCl_4$, $BCl_3$, $SiCl_4$, $TaCl_5$, $AlCl_3$, the same procedure is applied by employing as reducible salts $ZrCl_4$, $HfCl_4$, $NbCl_5$, $MoCl_5$.

The reaction supplies the carbide of the corresponding metal. Mixed carbides are obtained when making use of chlorides of different metals mixed together.

EXAMPLE 11

The different chlorides considered in the preceding example are employed alone or mixed together by replacing the reducing agent by calcium nitride obtained in situ as in Example 2 or by calcium cyanamide obtained in situ as in Example 3.

There are then obtained in the form of submicronic powder the nitrides or the carbonitrides of the metallic elements which are present in the reducible salts.

Naturally, the invention is not limited to the examples described in the foregoing or to the particular conditions of application thereof.

I claim:

1. A method for preparing a ceramic carbide powder, comprising:
   (a) forming an intermediate compound by reacting substantially stoichiometric proportions of a metalloid consisting substantially of carbon in the solid state with a reducing metal selected from the group consisting of lithium, sodium, potassium, beryllium, magnesium, calcium, strontium, barium, uranium, and a mixture of Al and Li, within a liquid bath which comprises the molten halide of said reducing metal, said intermediate compound being in solution in said liquid bath; and
   (b) introducing a reducible halide of a refractory metal, selected from the group consisting of titanium, zirconium, hafnium, boron, silicon, tantalum, niobium, molybdenum, tungsten, aluminum, and mixtures thereof in the solid, liquid, or gaseous state, into said liquid bath in order to produce said ceramic powder by reacting said halide with said intermediate compound.

2. A method as claimed in claim 1 and further comprising:
   first dissolving said reducing metal in said bath, and maintaining the amount of said bath sufficient to ensure complete dissolution of said intermediate compound.

3. A method as claimed in claim 1 and further comprising:
   controlling the temperature of said bath to allow the introduced reducible salt to vaporize in order to react in the gaseous state.

4. A method as claimed in claim 1 and further comprising:
   adding a sufficient amount of reducing metal to react excess metalloid left by the reaction of step (b).

5. A method as claimed in claim 1 wherein said reducing metal is calcium.

6. A method as claimed in claim 1 wherein said bath consists of molten calcium chloride.

7. A method as claimed in claim 1 wherein said halide of said refractory metal is a chloride.

8. A method as claimed in claim 7 wherein said halide is introduced in the gaseous state.

9. A method as claimed in claim 1 wherein said refractory metal is selected from the group consisting of titanium, silicon, tantalum, tungsten and aluminum.

* * * * *